United States Patent [19]

Steiner et al.

[11] Patent Number: 4,641,557
[45] Date of Patent: Feb. 10, 1987

[54] ELECTRONICALLY CONTROLLED POWER SAW

[75] Inventors: Robert E. Steiner, St. Louis County; Karmen D. Cox, St. Charles County; Daniel A. Terpstra; James J. Metzger, Jr., both of St. Louis County; Steven H. Plume, St. Charles County, all of Mo.

[73] Assignee: Emerson Electric Co., St. Louis, Mo.

[21] Appl. No.: 685,918

[22] Filed: Dec. 26, 1984

[51] Int. Cl.⁴ ............................................. B26D 5/30
[52] U.S. Cl. ...................................... 83/71; 83/471.3; 83/486.1; 83/522; 83/527; 83/581; 364/475
[58] Field of Search ............... 83/71, 522, 527, 72–74, 83/425, 432, 581, 471.3, 477.2, 477.1, 486.1, 489; 408/16; 409/214; 364/475; 33/1 M, 1 N; D8/64, 66; D10/65

[56] References Cited

U.S. PATENT DOCUMENTS 3,482,610 12/1969 Botefuhr .......................... 83/581 X
3,688,815 9/1972 Ridenour .............................. 83/522
4,442,606 4/1984 Graham et al. ...................... 33/1 N
4,527,244 7/1985 Graham et al. ................. 364/475 X

FOREIGN PATENT DOCUMENTS 159861 4/1983 German Democratic Rep. ... 33/1 N

Primary Examiner—James M. Meister
Assistant Examiner—John L. Knoble
Attorney, Agent, or Firm—Polster, Polster and Lucchesi

[57] ABSTRACT

A power saw includes a motor for driving a saw blade or the like around its rotational axis to cut a workpiece. The position of the rotational axis with respect to a reference position is sensed and a manually operated keyboard is provided for entering a desired change in the position of the rotational axis. Positioning motors are provided along with circuitry which is responsive to the entering of a desired change in the position of the rotational axis of the saw blade for moving the axis correspondingly.

54 Claims, 12 Drawing Figures

4,641,557

ELECTRONICALLY CONTROLLED POWER SAW

BACKGROUND OF THE INVENTION

This invention relates to power equipment and, more particularly, to power saws with improved electronic controls.

Power saws, such as radial arm saws and table saws, are known which perform a great variety of functions on a workpiece with considerable accuracy. Among these functions are beveling, mitering, cutting completely through a workpiece, and cutting only partially through a workpiece. Typically, the operator of such a power saw can spend a good deal of time in setting up a power saw to make some of the more complicated cuts. Generally, this set-up can involve manually adjusting the elevation of the saw blade with respect to the workpiece, manually setting the miter angle to be cut, and manually setting any desired bevel angle. Even the operator who takes the time to perform these operations carefully, however, does not always achieve the accuracy he might wish for from cut-to-cut, simply because the accuracy of the resulting cut is dependent in part upon the operator's technique in performing the set-up operation. Different operators using the same equipment can achieve widely varying results, depending upon their techniques. In addition, some prior power saws had scales for saw elevation, miter angle or bevel angle which were inconvenient or difficult to read.

SUMMARY OF THE INVENTION

One of the objects of the present invention is to provide a power saw which is convenient to use.

Another object is to provide such a power saw with improved accuracy.

Another object is to provide such a power saw with easy-to-read settings.

Another object is to provide such a power saw which can be consistently set up in a minimum amount of time.

Another object is to provide such a power saw which is easy to adjust,

Another object is to provide such a power saw which limits the changing of settings during cutting operations.

Other objects and features will be in part apparent and in part pointed out hereinafter.

Briefly, the power saw of the present invention includes means adapted for driving a saw blade or the like around its rotational axis to cut a workpiece, means for sensing a position of the rotational axis with respect to a reference position, and manually operable means for entering a desired change in the position of the rotational axis. Means responsive to the entering of a desired change in the position of the rotational axis is provided for moving the axis correspondingly, the moving means including a positioning motor which, when energized, changes the position of the rotational axis.

BRIEF DESCRIPTION OF THE DRAWINGS

Similar reference characters indicate similar parts throughout the several views of the drawings.

DESCRIPTION OF THE PREFERRED EMBODIMENT

Figure 1:
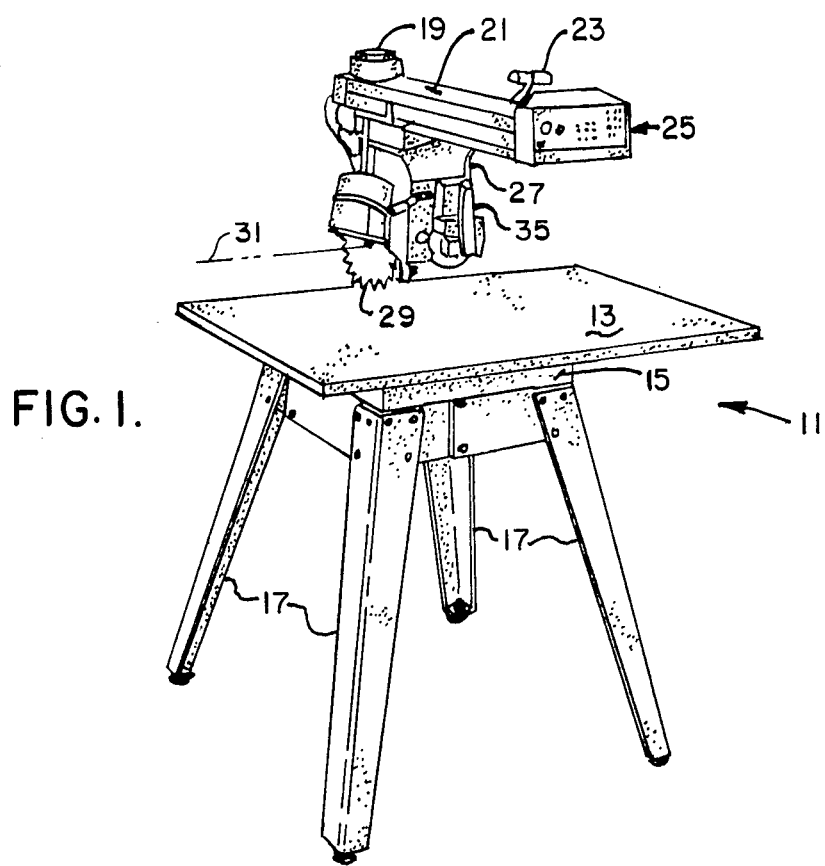
FIG. 1 is a view in perspective of a radial arm saw of the present invention.

An electronic radial arm saw 11 (FIG. 1) of the present invention includes a table 13 suitably mounted on a base 15 supported by four legs 17. A vertical column 19 extends from base 15 and supports horizontal arm 21. An arm control lever 23 extends through arm 21. At the end of arm 21 opposite column 19 is an electronic control panel 25 (shown in more detail in FIG. 3A). A yoke assembly 27 is slidingly suspended from arm 21 and carries a saw blade 29 having an axis of rotation 31. Blade 29 is driven by a motor 33 (see FIG. 3). Yoke 27 also includes a handle 35 for pulling saw blade 29 through the workpiece (not shown).

Figure 2:
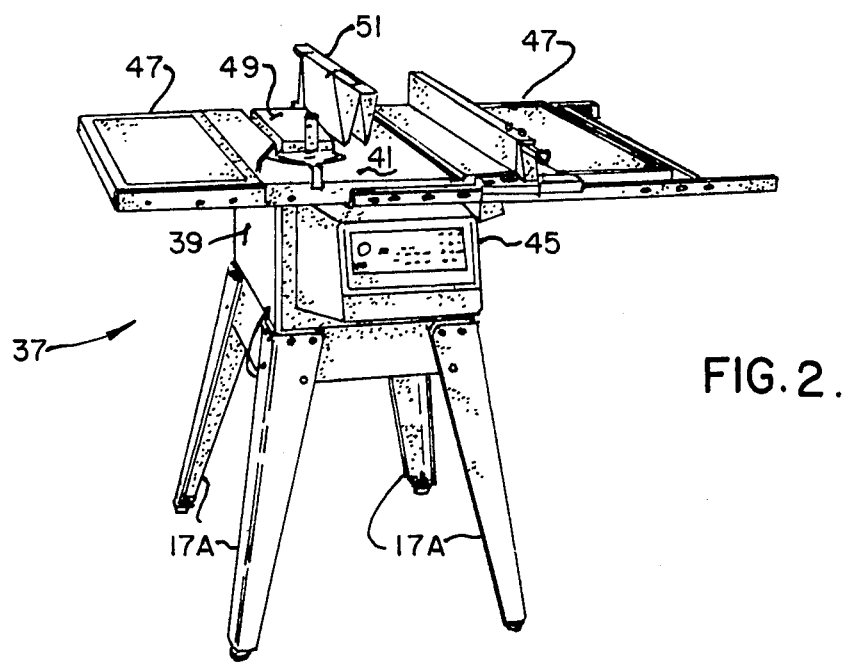
FIG. 2 is a view in perspective of a table saw of the present invention.
Figure 4B:
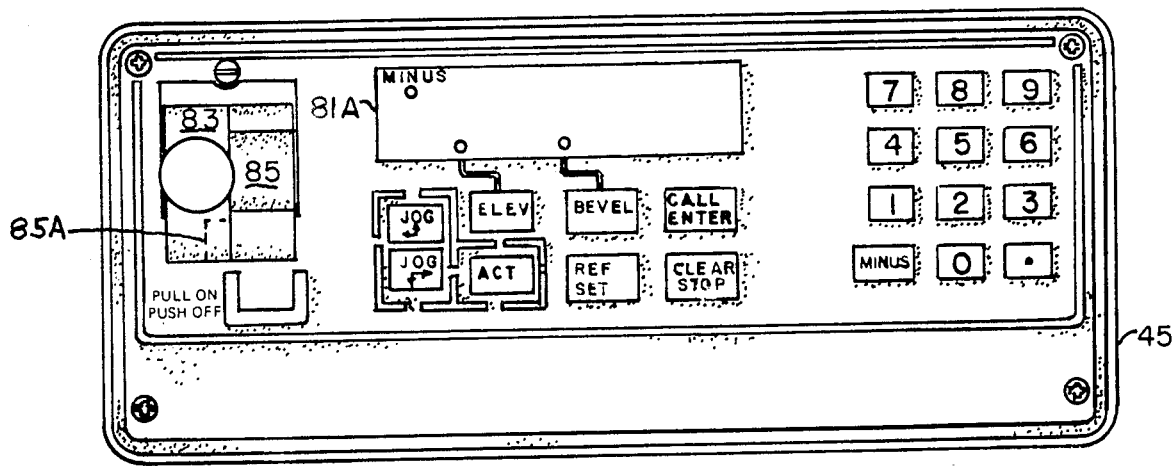
FIG. 4B a front elevation of the control panel of the table saw of FIG. 2.

Similarly, a table saw 37 (FIG. 2) of the present invention includes four legs 17a supporting a housing 39 on which is suitably secured a table 41. Housing 39 houses the saw blade (see FIG. 4A) and a motor 43 (FIG. 4) protrudes from the rear thereof for driving the blade. An electronic control panel 45 depends from the front of the housing. A pair of table extensions 47 are suitably connected to table 41. A removable miter gauge assembly 49 is provided which fits in a groove in table 41. A blade guard assembly 51 is also suitably secured to table saw 37.

Figure 3:
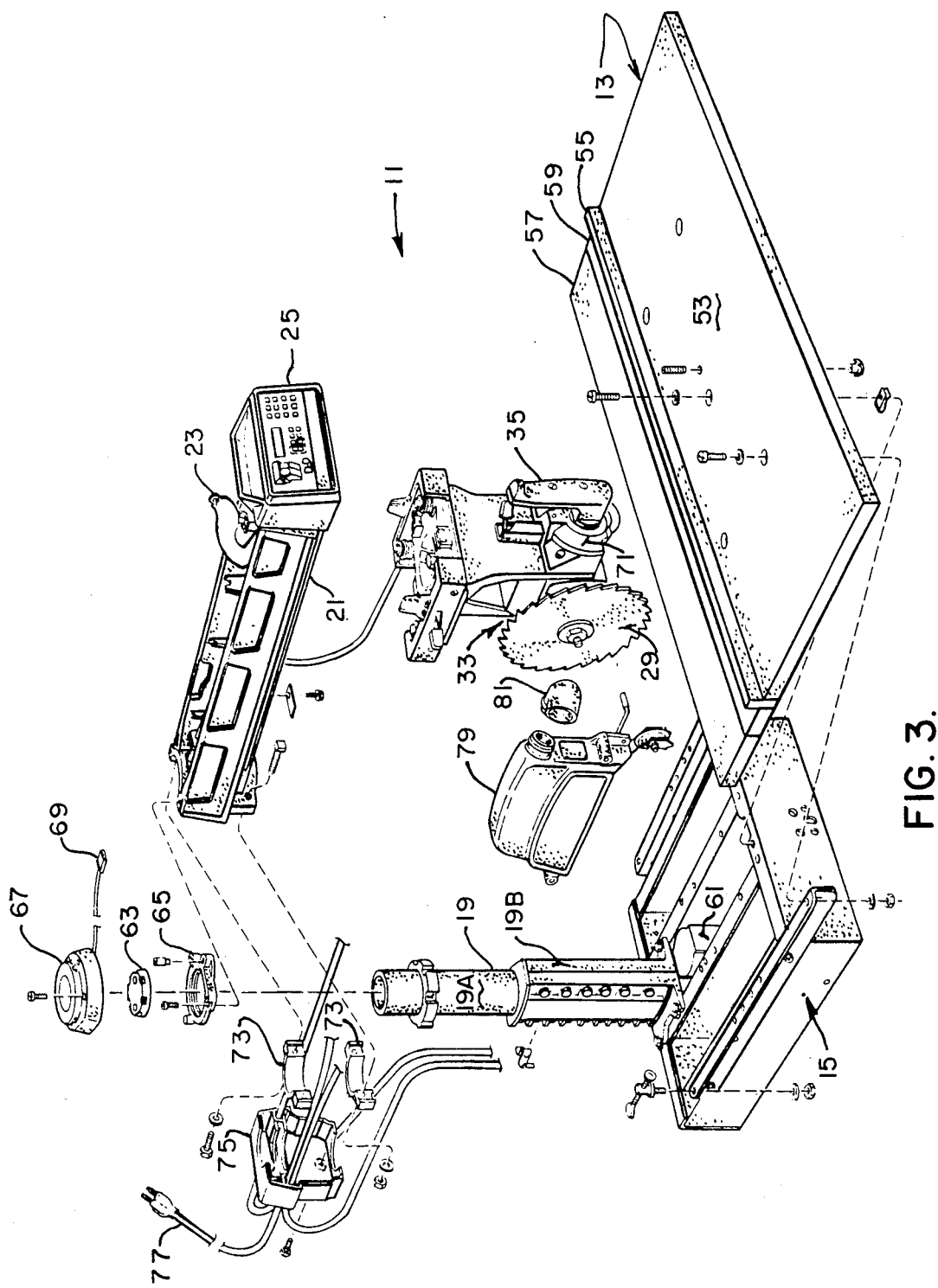
FIG. 3 is an exploded view in perspective of the radial arm saw of the present invention.
Figure 3A:
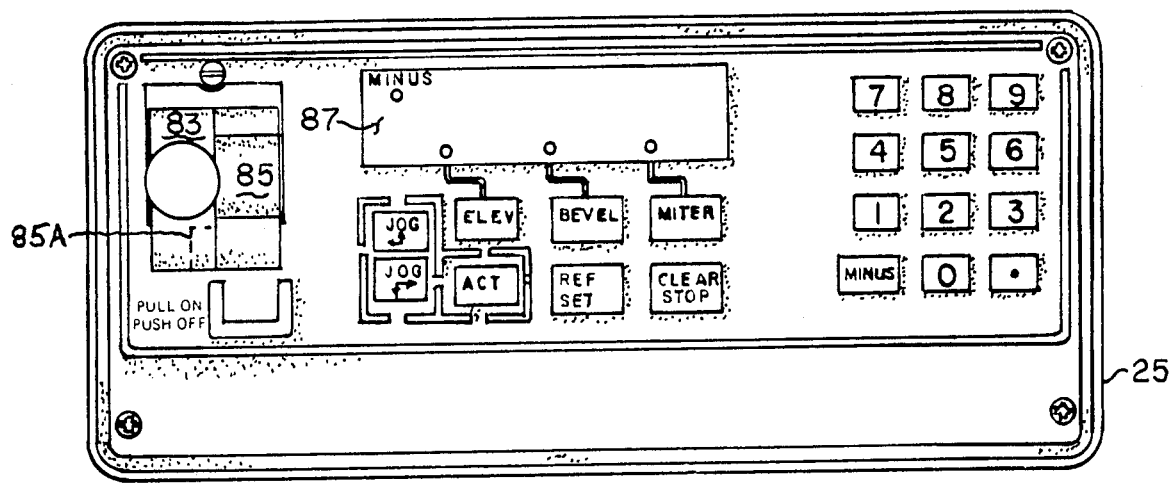
FIG. 3A is a front elevation of the control panel of the radial arm saw of FIG. 1.

Turning to FIG. 3, radial arm saw 11 is shown in greater detail. Table 13 includes a front table 53 suitably secured to base 15. Immediately behind front table 53 is a rip fence 55 which is spaced from a rear table 57 by a table spacer 59. Disposed at the bottom of column 19 is a positioning motor and transmission or gear assembly 61 which, under command from electronic control panel 25, raises and lowers the saw blade 29. More particularly, motor 61 changes the elevation of the rotational axis of saw blade 29 by raising and lowering the top half of column 19, labeled 19A, with respect to the fixed bottom half, labeled 19B, using a threaded vertical elevating shaft (not shown). Half 19A is slidably secured in lower half 19B and has an elevation nut fixed with respect to the column portion 19A. The threaded elevating shaft is rotated in the elevation nut to change the relative positions of portions 19A and 19B to change the blade elevation. The transmission or gear assembly portion of motor 61 reduces the motor's speed and increases the torque to levels suitable for the threaded elevating shaft.

Column 19 terminates in a cap 63 which fits in an encoder mount 65 to which is secured a miter encoder 67. The miter encoder is used to sense the miter angle, which is manually set by the operator of radial arm saw 11. It is connected to the circuitry of control panel 25 by a suitable plug 69. A similar encoder 71 is provided adjacent handle 35 and saw blade 29 to sense the bevel angle, which is also manually set by the operator of saw 11.

When assembled, arm 21 is secured with respect to column 19 by a pair of arm bearings 73 and the fasteners illustrated. A cover 75 is provided at the rear of arm 21 through which a power cord 77 passes. This power cord can be plugged into any suitable outlet to provide power for motor 33 (which drives blade 29), for positioning motor 61, and for the control circuitry discussed below. Also shown in FIG. 3 are a guard assembly 79 and dust elbow 81 for protecting the operator and removing dust from the operating area.

Control panel 25 (see FIG. 3A) includes a master switch 83, a saw motor switch 85, a display 87, a set of labeled number keys, and a set of labeled control keys or switches. The control keys include a rocker-type jog key labeled twice with the word "JOG" and with arrows pointing in the direction in which it is desired to move the rotational axis of the saw blade. A key labeled "ELEV" is used to display current elevation of the rotational axis of the saw blade and to put the control circuitry in the elevation mode. Similarly, control keys labeled "BEVEL" and "MITER", when pressed, cause the current bevel and miter positions, respectively, of the rotation axis to be displayed in display 87. An actuate key labeled "ACT" is used to initiate movement to a previously entered elevation. A key labeled "REF SET" is a reference key which sets the display to a zero point whenever it is pressed. And a key labeled "CLEAR/STOP" is used to clear the display if the control circuitry is being programmed from the control panel. This latter key will also stop a programmed motion of the rotational axis of the saw blade, once begun, and clear the entered destination.

Master switch 83 is the power on/off switch for the display 87 and for the control and numeric keys discussed above. The control circuitry itself has constant power as long as saw 11 is plugged into a 120-volt live power supply, whether or not master switch 83 is on or off. Turning master switch 83 off also shuts off power to the saw motor. Saw motor switch 85 is used to turn the saw motor on and off. Display 87 serves several functions. The position of the decimal point on the display indicates what function, either elevation, bevel angle, or miter angle, is being displayed. Display 87 also can display at least three digits simultaneously, which represent the present position of the rotational axis of the blade (or equivalently, the present position of the blade). It should be understood that in referring to position, this can refer to elevation, bevel angle, or miter angle. The display can also be used to display a desired destination entered from the numerical keys as part of programmed operation of the saw. Display 87 also includes a minus indicator in the upper lefthand corner which lights when the displayed number is negative (less than the "zero" position), or when the minus key of the numeric keys is pressed after a desired elevation is entered.

Figure 4:
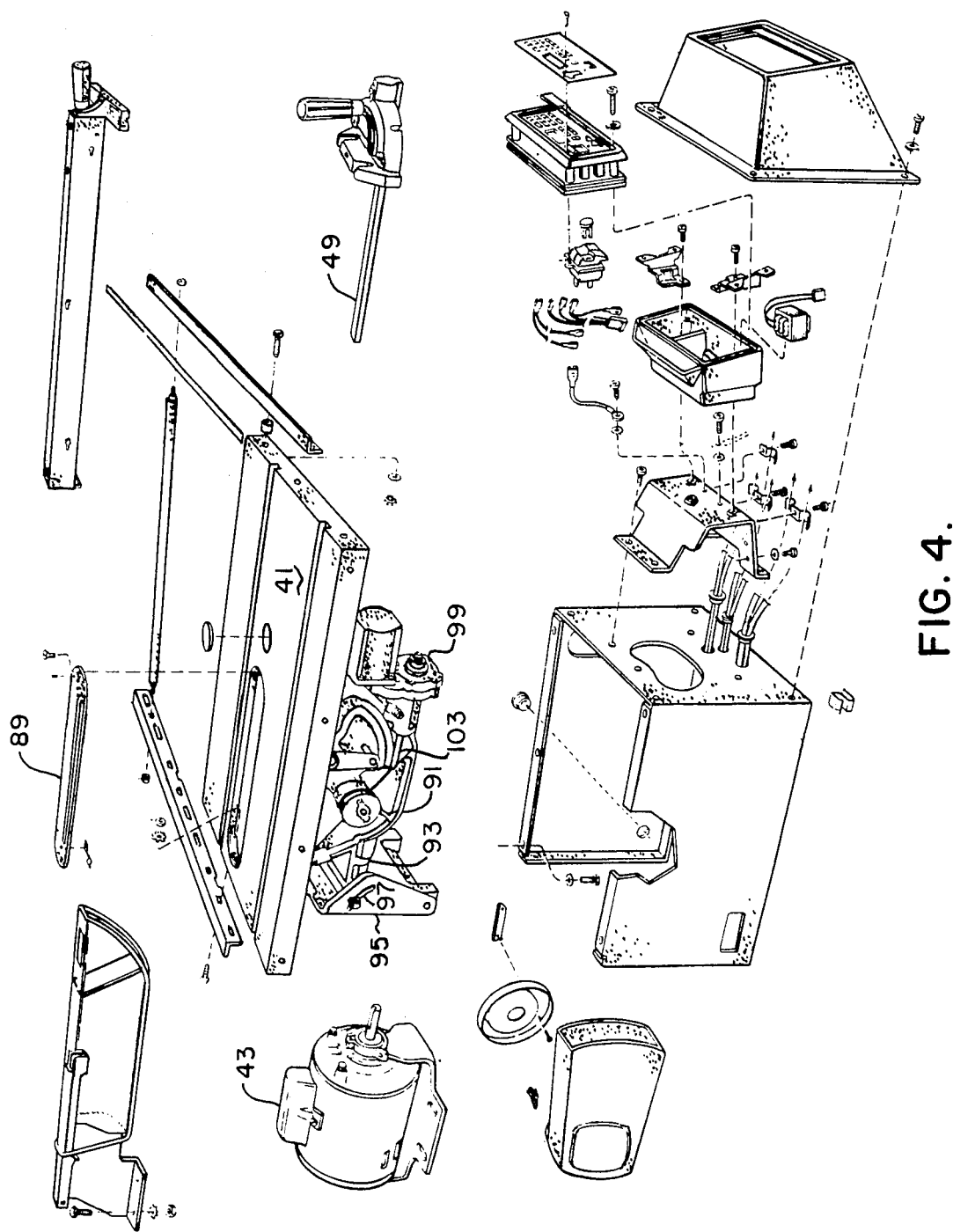
FIG. 4 is an exploded view in perspective of the table saw of the present invention.
Figure 4A:
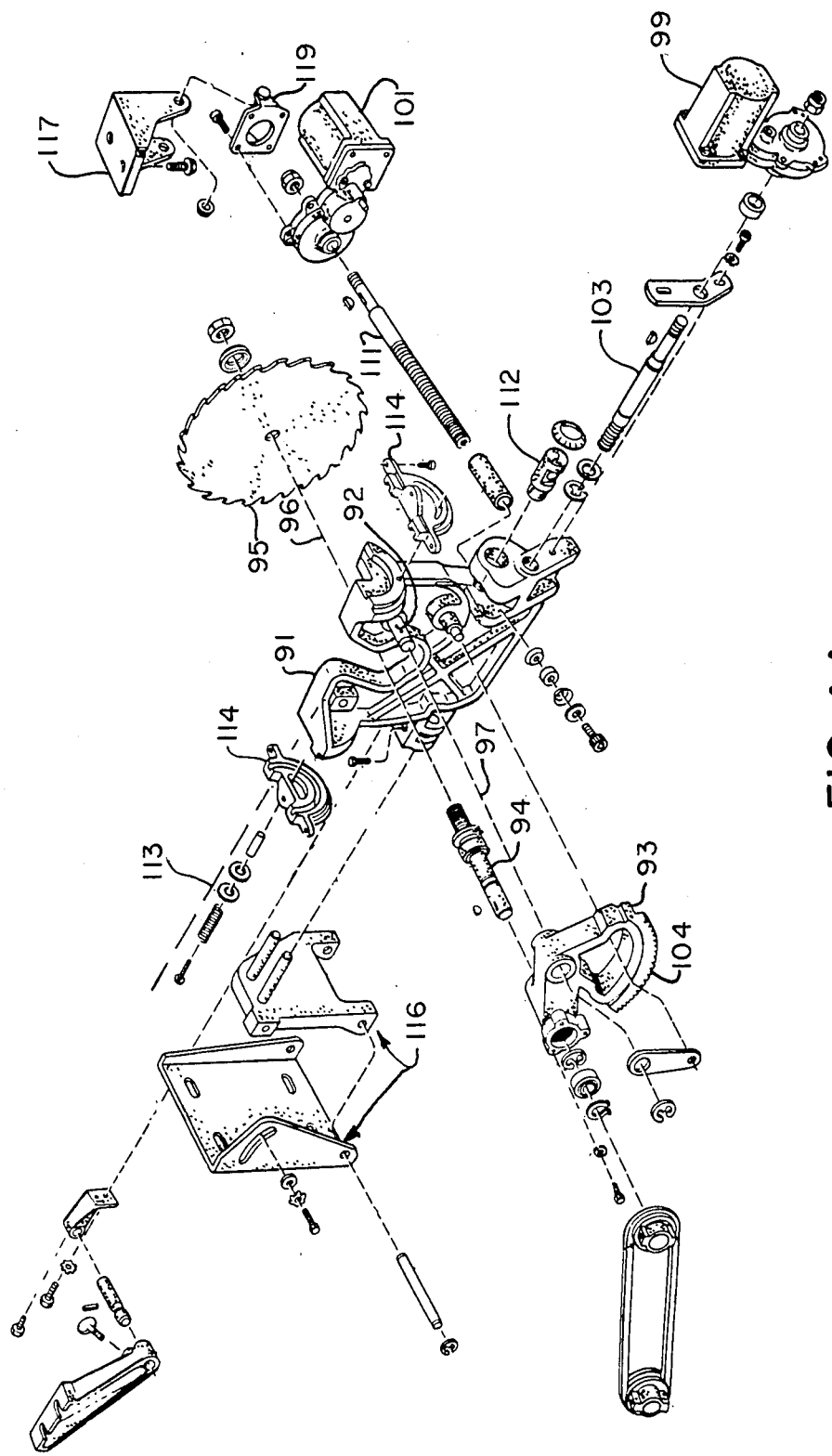
FIG. 4A is exploded view in perspective of the table saw illustrating angle and elevation adjusting mechanisms of the present invention.

Turning now to FIG. 4, table 49 includes an insert assembly 89 which is suitably securable to table 49 of table saw 37. Below the surface of table 49, motor 43 drives the blade around its rotational axis by means of a pulley and belt drive (not shown). A cradle 91 allows the bevel angle and elevation of the rotational axis of the saw blade to be adjusted. More particularly, cradle 91 includes a pin 92 (FIG. 4A) about which an arbor housing 93 is rotatably secured. An arbor 94 is secured in arbor housing 93 and saw blade 95 is secured to the arbor. Arbor 94 thus defines the rotational axis 96 of saw blade 95 and allows the blade to be pivoted with respect to a pivot axis 97 defined by pin 92. The actual changes in blade axis elevation and bevel angle are accomplished by a pair of positioning motor and gear assemblies 99 and 101 (see FIG. 4A for positioning motor 101). Positioning motor 99 drives a threaded shaft 103 with respect to a gear rack 104 of arbor housing 93 to cause arbor housing 93 to move upwardly or downwardly to change the elevation of the rotational axis of the blade. Threaded shaft 103 actually extends through cradle 91 and meshes with the gear rack 104 of the arbor housing. As the shaft rotates, arbor housing 93 is pivoted around axis 97 to raise or lower blade 95. More particularly, rotation of positioning motor 99 in one direction will cause the arbor housing to raise the saw blade, while rotation in the other direction will cause it to be lowered.

Similarly, rotation of positioning motor 101 causes a threaded shaft 111 to force cradle 91 to rotate about an axis 113, which is coincident with the top of table 41. This motion, of course, changes the bevel angle of axis 96. Threaded shaft 111 is threaded through a pivot nut 112 rotatably secured to cradle 91. As shaft 111 rotates it causes cradle 91 to rotate with respect to two trunnions 114 which are secured to table 41. The rotation is about axis 113 because the grooves of the trunnions are circular with a center coincident with the table top. Positioning motor 101 is suitably secured by brackets 117 and 119, as indicated, to table top 41.

Motor 43 is ecured to cradle 91 by a motor mount 116 and rotates with cradle 91.

The control panel 45 (see FIG. 4B) of table saw 37 is very similar to control panel 25 of radial arm saw 11. Both include master switch 83, saw motor switch 85, labeled number keys, a display, and control keys. The display for control panel 45 is labeled 87A, and differs from that of the radial arm saw only in that a decimal point is not used to indicate that a miter angle is being displayed. In the table saw, a manual miter gauge 49 (see FIG. 2) is used to set the miter, and this miter angle is not displayed in display 87A. In place of the MITER control key of control panel 25, control panel 45 has a control key labeled "CAL/ENTER". This key is a dual purpose key. When the saw is first plugged in, or there has been a power interruption, the key operates as a calibration key. Pressing the key with the blade 105 at 90 degrees to the table and at zero elevation accurately initializes the program that computes the elevation and bevel angle of the blade. Once the calibration has been set, the key becomes an enter key, used for entering both a bevel and an elevation programmed motion. In addition, the arrows on the JOG control key in display 45, unlike those of control panel 25, each point in two directions because the JOG switch is used in control panel 45 to control not only elevation, but also bevel angle.

Figure 5:
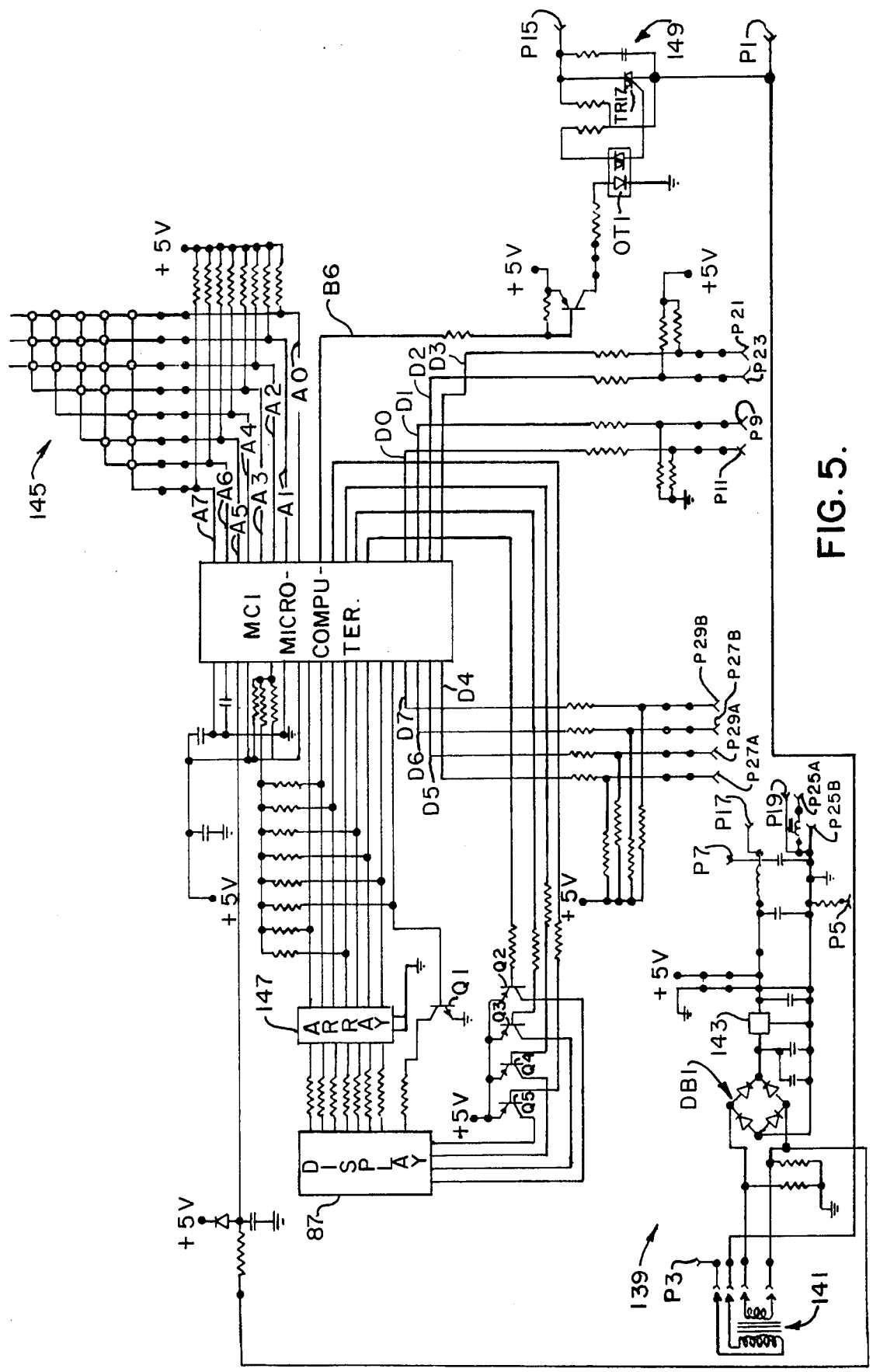
FIG. 5 is an electrical schematic of control circuitry of the radial of the present invention.
Figure 5A:
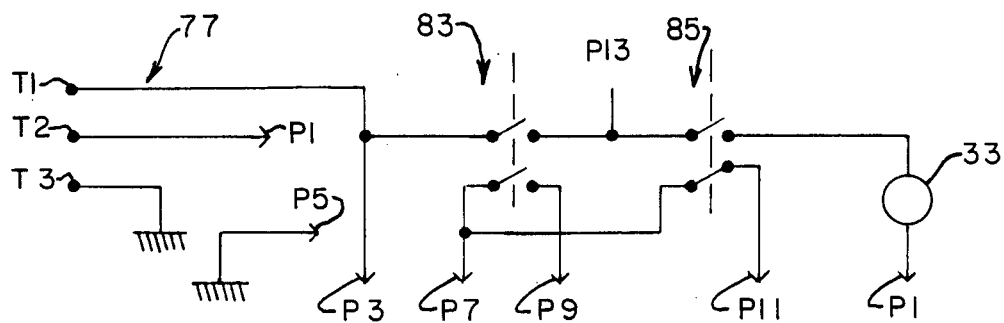
FIG. 5A is an electrical schematic of power input and switch connection used in the saws of the present invention.

The power input and master and saw motor switch connections for both the table saw and radial arm saw are shown in FIG. 5A. A three-wire power cord, such as cord 77, is adapted to be connected to a 120-volt, 60 hz power source (not shown), by terminals T1, T2, and T3. The full voltage from the 120-volt source is impressed across terminals T1 and T2, while terminal T3 serves as a ground for the system. Terminal T1 is connected through one switch arm of master switch 83 and one switch arm of saw motor switch 85 to the respective saw motor. In FIG. 5A, this saw motor is labeled 33, although it should be understood that the connection to motor 43 of the table saw is identical. The other side of motor 33 is connected through a terminal P1 back to terminal T2, thereby completing the circuit through motor 33 when both the master switch and the saw motor switch are closed. Opening either switch, since these switches are in series, causes motor 33 to be de-energized. In addition, a mechanical interlock is provided to ensure that the saw motor switch is mechanically turned off when the master switch is turned off. Specifically, this interlock is a finger 85A (see FIG. 3A) extending from switch 85 behind switch 83. When switch 83 is switched off, it engages finger 85A to switch off switch 85 as well.

Figure 5B:
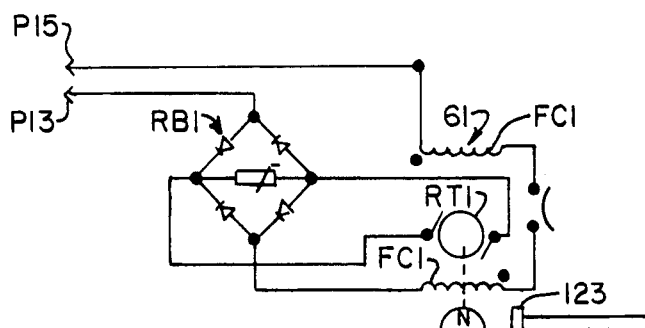
FIG. 5B is an electrical schematic of positioning and position-sensing of the saws of the present invention.
Figure 6:
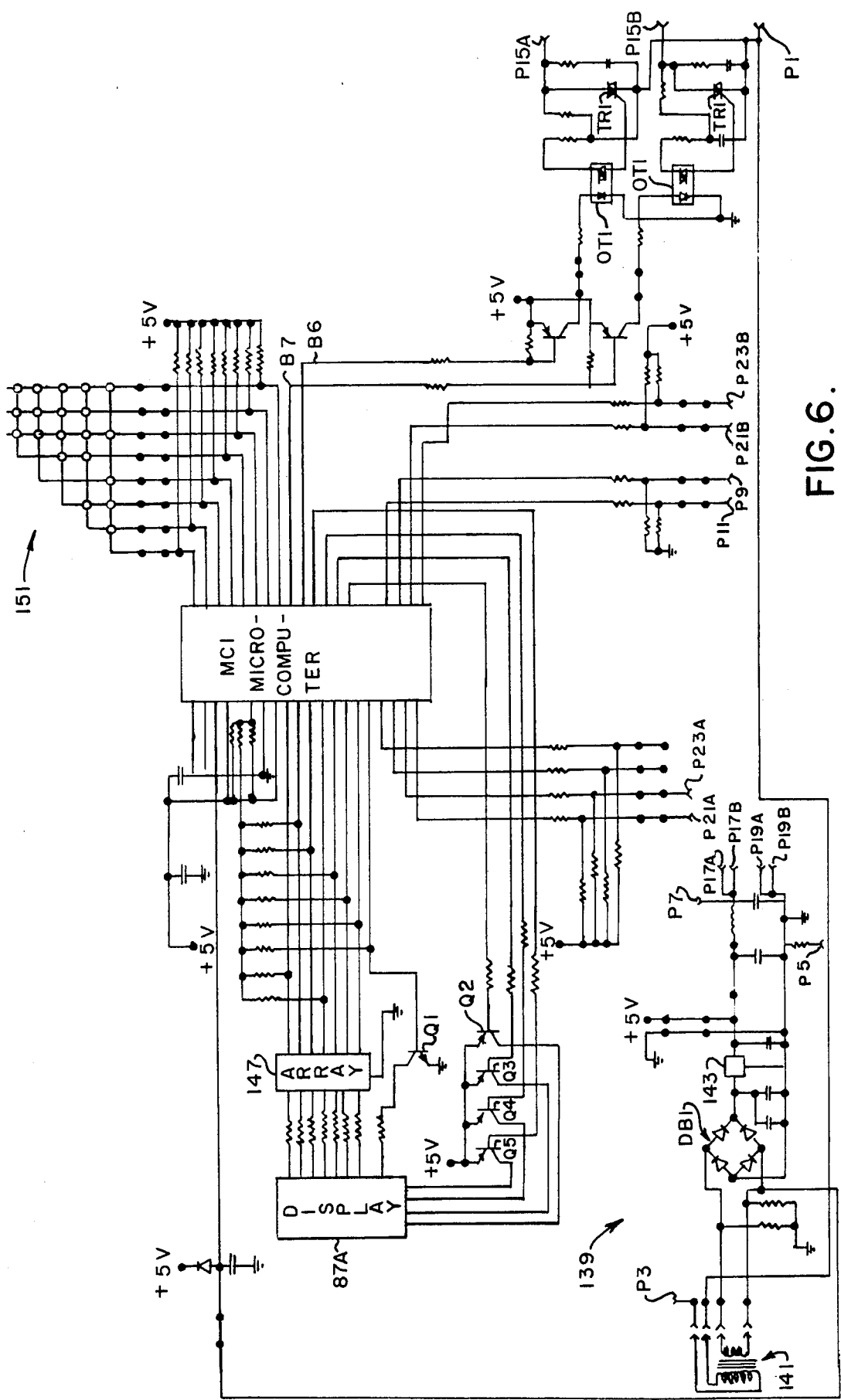
FIG. 6 is an electrical schematic of control circuitry for the table saw of the present invention.

In addition to being connected through switches 83 and 85 to motor 33, power terminal T1 is also connected through a terminal P3 to the rest of the control circuitry (FIGS. 5 and 6). Likewise, a system ground on terminal T3 is supplied via a terminal P5 to the rest of the circuitry. It should be noted that both master switch 83 and saw motor switch 85 have two pairs of contacts. In the case of master switch 83, the lower set of contacts are normally open. But when the switch is closed, the second switch arm completes a circuit between the two contacts, one of which is connected via a teminal P7 to a plus five-volt source. The other contact is connected via a terminal P9 to a microcomputer, described below. The voltage level on terminal P9, therefore, respresents whether or not master switch 83 is closed. The second set of contacts of saw motor switch 85 are normally closed. One of these contacts is connected through terminal P7 to the five-volt source, while the other is connected via a terminal P11 to the microcomputer mentioned above. Thus, when the voltage on terminal P11 goes to a logic Low, it signals that the saw motor switch has been closed. A terminal P13 also connects terminal T1 to any of the positioning motors 61, 99, and 103 (shown in FIG. 5b) whenever the master switch is closed. As a result of this connection, the positioning motors cannot be operated when master switch 83 is off.

Referring to FIG. 5B, positioning motor 61 is shown, although it should be understood that the circuitry for positioning motor 99 and 101 is the same. Each positioning motor is a universal-type motor, with a rotor RT1, fed by a full wave rectifier bridge, RB1, so that current in the rotor is always in the same direction, regardless of direction of current flow through the field coil FC1 of the motor. This gives the capability of reversing the motor by reversing the current flow through the field coil. The other side of field coil FC1 is connected via a terminal P15 to motor control circuitry described below. It is this circuitry that determines the direction of current flow through field coil FC1.

A magnet 121, which is magnetized across one diameter, is attached to the shaft of each positioning motor. Two Hall effect sensors 123 and 125 are placed 90 degrees apart on a circle just larger than the diameter of magnet 121. These sensors are affected by the magnet as it rotates, so that each produces an output (a logic High) during approximately 180 degrees of shaft rotation, and ·no output (a logic Low) during the remaining 180 degrees of shaft rotation. Since the sensors are located 90 degrees apart, a pair of square waves are produced which are said to be in quadrature. Each Hall effect sensor is connected via a terminal P17 to a plus five-volt source and via a terminal P19 to a line nominally at zero volts. The circuitry of FIG. 5B also includes a terminal P21 for supplying the output of Hall effect sensor 125 to the microcomputer discussed below, and a terminal P23 for supplying the output of Hall effect sensor 123 to the microcomputer. The computer or control logic is able to sense each transition from a logic Low to a logic High and back. Since there are four such transitions in each motor revolution, the microcomputer can count motor revolutions in one-quarter turn increments. It is also programmed to sense the phase relationship between the two quadratured square waves to determine which direction the motor is rotating.

Figure 5C:
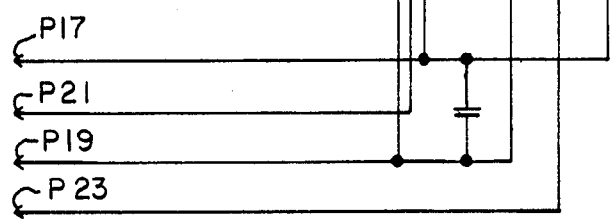
FIG. 5C an electrical schematic of position encoding circuitry of the saws of the present invention.
Figure 5C:
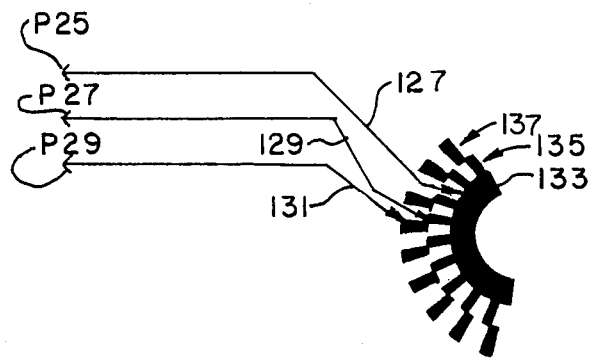

The construction of angle encoders 67 and 71 is illustrated in FIG. 5C. Each encoder such as encoder 67 (FIG. 3) includes a disk arranged to rotate relative to three fixed contacts 127, 129, 131, when the radial arm saw arm 21 is rotated to change the miter angle or the motor 33 itself is rotated to change the bevel angle. Each disk is insulating and has stepped radial conductive traces thereon. In particular, it has three traces, the innermost of which (labeled 133) is continuous, while the outer two, labeled 135 and 137, are not continuous. Although all three traces are concentric, the conductive portions of traces 135 and 137 are not aligned. In fact, traces 135 and 137 are displaced with respect to each other a sufficient amount so that when the disk is rotated relative to the contacts and voltages applied to the inner contact 127, voltages appear on contacts 129 and 131 (the middle and outer contacts), which are identical to the quadrature square waves generated by the Hall effect sensors discussed above in connection with FIG. 5B. The steps of traces 135 are spaced two degrees apart completely around a circle, as are those of trace 137. The microcomputer senses the transitions in the square waves. Since there are four transitions in each two-degree interval, the microcomputer can count encoder motion in one-half degree increments. By sensing the phase relationship between the two quadrature square waves, the microcomputer, in addition, can determine whether the angle being measured is increasing or decreasing. Contact 127, which is in constant contact with inner trace 133, is connected via a terminal P25 to a line nominally at zero volts. Contact 129 and contact 131 are connected through a pair of terminals P27 and P29 to the microcomputer to supply the square waves thereto. The widths and height of traces 135 and 137 on the disks and the radii of the contact tips must be carefully controlled to obtain the proper ratio of output (a logic High to no output (a logic Low) in the quadratured square waves.

Referring to FIG. 5, power from terminals T1 and T2 is supplied via terminals P1 and P3 to an isolated and regulated five-volt DC power supply 139. Supply 139 includes a transformer 141, a diode bridge DB1, a 7805-type voltage regulator 143, and filter capacitors to provide the desired isolation and regulation for the control circuitry and encoders 67 and 71. Since only one encoder is schematically shown in FIG. 5C, the connections to power supply 139 from the encoders are labeled P25A and P25B to distinguish them instead of just P25. The control circuitry includes a 6805-type microcomputer MC1, which is suitably programmed to perform the functions described below. This particular type microcomputer has memory on board so that its program can be stored without the use of external memory. Microcomputer MC1 is connected through a set of eight address lines A0-A7 to the numeric and control keys of control panel 25. These keys are arranged in a matrix labeled 145. The open circles in the matrix represent the keys themselves. Depressing one of the keys causes a circuit to be completed at the intersection in the matrix where that particular key is located. In a conventional manner, microcomputer MC1 strobes the rows or the columns of the matrix, as desired, and then reads the other of the rows or the columns to determine if a key has been pressed and, if so, to identify that key. In matrix 145, the top row of keys represent the digits 9, 8, and 7; the second row represents the numeric digits 6, 5, and 4; the third row represents the numeric digits 3, 2, 1, and 0; the fourth row represents the decimal point key, the Bevel key, the Miter key, the minus key, and the Elevation key; and the fifth row represents the Jog-up switch, the Jog-down switch, the Reference Set key, the Clear/Stop key, and the Actuate key. As is conventional, microcomputer MC1 strobes matrix 145 at regular intervals to determine if any of the switches are closed.

Microcomputer MC1 has a second set of eight lines labeled D0-D7, which it uses as inputs. Specifically, line D0 is connected through a resistor network to terminal P11. When terminal P11 is at a logic High, saw motor switch 85 is open, and line D0 of the microcomputer is also High. When the saw motor switch is closed, terminal P11 goes Low, and this Low is supplied on line D0 to the microcomputer. Similarly, line D1 supplies to the microcomputer the information concerning whether master switch 83 is opened or closed. Lines D2 and D3 supply the square waves from the Hall effect sensors 123 and 125 via terminals P21 and P23. With this information, the microcomputer can count the number of revolutions of the positioning motor, determine its direction of rotation, and thereby calculate the actual elevation of the rotational axis of the saw blade. Lines D4 through D7 are connected to the encoder output terminals, which generate square waves reflecting the miter angle and the bevel angle, as those angles are manually changed. Since only one encoder is shown in FIG. 5C, the terminals in FIG. 5 have been labeled P27A, P27B, P29A, and P29B, instead of just P27 and P29. The "A" terminals reflect the bevel angle encoder information, while the "B" terminals carry the miter angle information. In the event that the signals from the positioning motor sensor on the encoder sensors reveal the fact that the inputs are not consistent with quadratured squarewaves, which could indicate that there has been a sensing failure, the microcomputer stops any programmed motion and displays a warning.

The microcomputer uses all these inputs to drive display 87, which it does by means of a 3081-type transistor array 147 and five discrete transistors Q1-Q5. Microcomputer MC1 also controls positioning motor 61 over a line labeled B6. The signal on line B6 is supplied through a transistor to an opto-triac OT1, which in turn drives a drive triac TR1, which has a snubber 149 connected in parallel therewith. This provides half-wave rectified DC voltage to the elevation positioning motor 61 via terminal P15. By turning the triacs on at the proper time, the microcomputer is able to choose which half cycle (i.e., positive or negative) is conducted to the motor in order to provide "up" or "down" motion. By delaying the turning on of the triacs, the microcomputer can reduce the power to the motor to provide speed and torque control in a technique called "phase control". The microcomputer is also able to turn the triacs on to provide current in a direction to brake the motor, if necessary. More particularly, it is necessary to control positioning motor 61 and the other positioning motors to have a smooth startup, move as rapidly as possible toward the destination, and slow to a stop as near as possible to the destination. To achieve this, the phase control of the motor is divided into stages. During starting, the triac firing angle is increased linearly with time to cause the motor to accelerate reasonably smoothly. The actual speed versus position will vary with friction and inertia in the mechanism. The motor then moves at nearly constant speed by adjusting the triac firing angle to vary power to the motor. The triac firing angle is deliberately changed slowly to minimize surging or oscillation caused by rapidly varying power to the motor. If the motor overspeeds above a preset limit, the control circuitry causes one or more line cycles to be dropped, thus temporarily reducing power to the motor without requiring rapid changes to triac firing angle. When the motor approaches the desired destination it reaches what is called a target slow down line at which the triac firing angle is reduced to start slowing the motor and then the motor speed is regulated along a decreasing line calculated to halt the motor at the beginning of the destination zone. As during the constant speed state, the triac firing angle is changed slowly to avoid oscillation and if the motor overspeeds above preset limits one or more line cycles will be skipped to bring motor speed close to the target speed. In addition, if the motor overspeeds above a still higher limit during, the triac will be fired in the reverse direction to cause a braking action. This reverse braking is at a constant firing angle. When the positioning motor enters the destination zone, power is removed. The motor usually will be slowed enough to coast to a stop within the destination zone. If the motor does coast past the destination zone, the triac will be fired to reverse the motor. This reverse stage is basically a mirror image of the slow down stage. When the positioning motor enters the destination zone, the control circuitry counts the number of line cycles elapsed while the motor is within the destination zone. After a fixed number of cycles, power is removed from the motor even if the motor is still moving. This prevents the possibility of a continuing motor oscillation back and forth across the destination zone caused by slack or springiness in the positioning mechanism. If the positioning motor is started near the destination, it will accelerate only until it reaches the target slow down line and then will go directly into the slow down stage. When it is necessary to go past the final destination to take up the slack in the mechanism, the microcomputer first sets a target on the other side of the destination and then after the motor has passed the final destination by a present amount the motor is reversed and the final destination is approached in a similar manner.

The control circuitry for the table saw is almost identical to that of the radial arm saw. Therefore, in discussing the circuitry of FIG. 6, only the differences between it and the circuitry of FIG. 5 will be discussed. The switch matrix for the table saw is labeled 151, and differs from matrix 145 of FIG. 5 only in the fourth and fifth rows. In the fourth row of matrix 151, the keys represent the decimal point key, the Bevel key, the Enter/Calibrate key, the minus key, and the Elevation key. The keys of the fifth row are the Jog-up key, the Jog-down key, the Reference Set key, the Clear/Stop key, and the Actuate key.

Microcomputer MC1 for the table saw has four Hall effect sensor inputs P21A, P23A, P21B, and P23B, since the table saw uses positioning motors to change not only the elevation but also the bevel angle. The bevel angle signals appear on terminals P21A and P23A, while the elevation signals appear on terminals P21B and P23B. The use of the "A" and "B" nomenclature is required because only one positioning motor is shown in FIG. 5B. On the other hand, microcomputer MC1 does not receive inputs from any encoders such as that shown in FIG. 5C, because the table saw does not have such encoders.

The only other significant difference between the radial arm saw circuit of FIG. 5 and the table saw circuit of FIG. 6 is that the table saw microcomputer must drive two positioning motors: one for adjusting the elevation, and one for adjusting the bevel angle. This it does in exactly the same manner as in connection with adjusting the elevation of the rotational axis of the radial arm saw. Each positioning motor 99 and 101 is provided with its own drive triac TR1 and opto-triac OT1, which the microcomputer controls over lines B6 and B7. The controlled voltage is supplied to the elevation positioning motor over terminal P15A, and the controlled voltage is supplied to the bevel positioning motor over terminal P15B. There is also a difference in the program of microcomputer MC1 for the table saw. Because of the geometry of the elevation and bevel angle mechanisms in the table saw, the signals from the elevation and bevel Hall effect sensors are not linear. For example, each "count" from the elevation motor sensor may signify a different change in elevation when the blade is nearly all the way up (maximum elevation) than when it is lower. Microcomputer MC1 is programmed to compensate for this nonlinearity and give an accurate readout on display 87A by using a look-up table resident in the microcomputer. The bevel angle nonlinearity is handled similarly.

The operation of radial arm saw 11 is as follows:

Upon being plugged into a source of 120 volt, 60 hertz power, power supply 139 supplies power to the circuitry of FIG. 5 and in particular to microcomputer MC1. The microcomputer is programmed to ignore switch matrix 145 until master switch 83 is closed. Once switch 83 is closed, this fact is signaled to the microcomputer by way of terminal P9 and the microcomputer starts examining the switch matrix. The microcomputer also at this time is programmed to cause display 87 to display flashing zeroes. Since the microcomputer was not powered previously, it is now necessary to set the zeroes for elevation, bevel angle and miter angle. To do this the operator presses the ELEV key. The microcomputer is programmed to cause the decimal point above the Elevation key in the display to flash upon detection of closure of the Elevation key. This indicates that the system is in the change elevation mode. The Jog-up and Jog-down keys are then pressed as necessary to lower the blade to where the tip of the teeth of the blade just barely touch the top of the table. Closure of these keys cause the microcomputer to energize positioning motor 61 in the proper direction to raise or lower the elevation as required. Upon reaching the desired zero elevation, the operator presses the Reference Set key. Upon detecting the closure of this key, the microcomputer causes the display to display "0.000". Of course, if one wanted to set the zero elevation at some other point, he would simply raise or lower the blade as desired using the Jog keys and when the desired elevation was reached he would press the Reference Set key. This would cause that new elevation to be set as the zero elevation and stored as such in the microcomputer. So long as the power cord is not unplugged or the power otherwise interrupted, this reference level, and all the other references described below will continue to be stored in the microcomputer because power is supplied to the microcomputer even though master switch 83 might subsequently be turned off.

Similarly, to set the bevel angle zero position, one presses the Bevel key which puts the microcomputer into the bevel mode. The display shows a flashing decimal above the bevel key. The user then makes sure the motor is in the zero degree bevel position and presses the Reference Set key. The display shows "0.0". If desired, other bevel angles could be set as the zero angle simply by rotating the motor to that particular angle and pressing the Reference Set key. Likewise, the miter angle zero is set by pressing the Miter key, placing the saw blade in the desired miter position and pressing the Reference Set key. The display then shows "0.0". Usually, the zero position would be the 90 degree cut-off position as shown in FIG. 1.

To perform a miter cut with radial arm saw 11, one would press the Elevation key followed by the Jog-up key to raise the blade teeth out of the table kerf if necessary. Then the Miter key would be pressed to put the microcomputer in the miter mode. The arm 21 is then manually swung around to the desired miter angle. As the arm swings around, the encoder such as shown in FIG. 5C sends a pair of square waves to microcomputer MC1 and from those square waves the microcomputer calculates the miter angle as the arm is being swung. This angle is displayed in display 87 as the arm is swung to the desired angle. When the display reads the desired angle, the arm is locked in place. The operator presses the Elevation key and the Jog-down key to lower the blade teeth into the table kerf. The saw is now ready to cut along the desired miter angle. To do so, saw motor switch 85 is turned on, which provides power to motor 33 to drive blade 29 in rotation around its rotational axis. When saw motor switch 85 is closed, the microcomputer receives this information by way of terminal P11 and line D0. During the time the saw motor is on, the microcomputer will inhibit the programmed elevation operation described below.

To cut along a bevel, the operator after checking the miter and bevel settings by pressing the respective keys, would press the Elevation key and enter a number such as "2.3" and thereafter press the Actuate key. In response to this sequence, which is called programmed elevation, the microcomputer causes the blade to automatically rise 2.3 inches above the zero elevation position to give clearance to set the blade at the bevel angle. The operator then presses the Bevel key and turns the motor to the desired bevel angle. As the motor swings toward the desired bevel angle, the actual angle is displayed in display 87 because microcomputer MC1 keeps track of it by means of the bevel encoder 71. When the display reads the desired angle, the operator locks the bevel lock lever. He then presses the Elevation key to put the system in the elevation mode and presses the Jog-down key to lower the blade teeth into the table kerf. The saw motor switch 85 is then turned on and the cut is made.

There are actually three distinct ways of changing the elevation of radial arm saw 11. When the operator holds the Jog-up or Jog-down key closed, the microcomputer continuously raises or lowers the blade until the key is released. In a second mode, a tap on either the Jog-up or Jog-down key of less than a predetermined duration results in the microcomputer moving the blade up or down as requested in 0.005 inch increments. Finally, there is programmed elevation which is movement to an elevation entered by the operator from the keyboard using the numeric keys. Since the keyboard includes a minus key it is possible to set programmed elevation destinations either above or below the zero elevation (set using the reference set key). As the elevation is being changed in any of these modes, the display digitally displays the elevation relative to the set zero position just as soon as the Actuate key or the Jog keys are pressed. To increase consistency in setting the elevation, the microcomputer always approaches the desired programmed position from above so that any slack in the mechanism is always removed in the same direction.

If during a change of elevation a jam should occur, the microcomputer causes display 87 to flash the position at which the jam occurred. When the jam occurs when the blade is moving down, mico computer MC1 automatically raises the blade approximately one inch to free the workpiece or the like which may have been trapped under the blade.

It should also be realized that since the microcomputer determines the various positions and angles by means of counting transitions in square waves, it is necessary at all times for the computer to store the present location (i.e. elevation, miter angle, and bevel angle) in its memory. This information, like the zero references, is retained in the memory even if the master switch is turned off and until the saw is unplugged from the 120 volt power source.

The microcomputer also continuously (that is, at short, regular intervals in its program) monitors the miter angle and bevel angle encoders even when these angles are not being displayed so that the angle will be accurate. Otherwise, the operator could accidentally change the miter angle without pressing the Miter key and cause the microcomputer to miscalculate the actual angle when the Miter key was finally pressed.

The operation of table saw 37 is very similar to that of radial arm saw 11. However, the initial process when the saw is first plugged in is different. When the saw is plugged in and the master switch is first turned on, the microcomputer in response causes display 87A to show a flashing letter "C". This means that the table saw needs to be calibrated. The operator thereupon presses the Elevation key and then presses and holds in the Jog-up key to raise the blade until the maximum elevation is reached. The Jog-down key is then held in momentarily to pull the blade a short distance away from this maximum elevation. The operator then presses the Bevel key to put the microcomputer in the bevel adjustment mode. Pressing the Jog keys will now cause the bevel angle of the saw to be rotated to the right or the left. The appropriate key is pressed until the blade is square to the table. The operator then presses the Elevation key and then presses and holds the Jog down key to lower the blade until it is completely below the table top. He then repeatedly presses and releases the Jog-up key (to cause the blade to move up in 0.005 increments) until the tip of a saw tooth is just even with the table top. The operator then presses the Cal/Enter key and in response the microcomputer causes the display to read "0.000", which represents zero elevation. If the operator were then to press the Bevel key, the microcomputer would display "0.0" to indicate that the bevel angle is also zero. This calibration provides the zero points from which microcomputer MC1 calculates actual positions and present positions. Other zero reference points can be set by using the Reference Set key without affecting the calibration settings.

To perform a bevel cross-cut with the table saw, the operator turns the master switch on and presses the Bevel key. To make a 30 degree bevel, the operator would then press the number keys "3" and "0" and then press the Cal/Enter key. The operator then presses the Elevation key and the numbers "1.25" (which represents a desired elevation of 1.25 inches). The operator then presses the Actuate key. In response, the microcomputer controls positioning motors 99 and 101 to automatically raise the blade 1.25 inches above the surface of table 41 and tilt the blade to the correct bevel angle of 30 degrees. In approaching the programmed elevation of 1.25 inches, the microcomputer always approaches the elevation from below so that slack in the mechanism is always taken out in the same direction for accuracy. The same thing occurs in the programmed bevel mode.

Although the other features of table saw 37 are very similar or identical to those of radial arm saw 11, microcomputer MC1 is programmed to disallow all bevel motions when saw motor switch 85 is closed, for reasons of safety. Microcomputer MC1 is also programmed to approach bevel angles in increasing angle direction to remove slack from the mechanism in a consistent manner for accuracy.

In view of the above, it can be seen that various objects of the invention are achieved and other advantageous results attained. While a preferred embodiment of the present invention has been described, it should be understood that various changes, adaptations, and modifications may be made therein without departing from the spirit of the invention and the scope of the appended claims.

We claim:

1. A bench power saw comprising:
   a table for supporting a workpiece;
   means adapted for driving a saw blade or the like around its rotational axis to cut the workpice;
   means for sensing the elevation of the rotational axis with respect to a reference elevation;
   manually operable means for entering a desired final elevation of the rotational axis; and
   means responsive to the entering of a desired final elevation of the rotational axis for moving said axis to said elevation, said moving means including a positioning motor which when energized changes the elevation of the rotational axis;
   wherein the manually operable means further includes means for requesting a continuing change in elevation, the moving means being responsive to said request to continue changing the elevation within preset limits until the request ceases or the preset limits are reached.

2. A power saw as set forth in claim 1 wherein the requesting means includes first means for requesting a change in the elevation of the rotational axis in a first direction and second means for requesting a change in the elevation in the opposite direction.

3. A power saw as set forth in claim 1 wherein the moving means is responsive to an actuation of the requesting means lasting less than a predetermined time to change the elevation of the rotational axis a preset amount.

4. A power saw as set forth in claim 3 wherein the manually operable means includes means for entering a desired final elevation of the rotational axis, the moving means being responsive to the entering of a desired final position to move the rotational axis to said final position except when the driving means is driving the saw blade around its rotational axis, the moving means being responsive to the actuation of the requesting means for less than the predetermined time to change the elevation of the rotational axis the preset amount irrespective of whether the driving means is driving the saw blade.

5. A bench power saw comprising:
a table for supporting a workpiece;
means adapted for driving a saw blade or the like around its rotational axis to cut the workpiece;
means for sensing the elevation of the rotational axis with respect to a reference elevation;
manually operable means for entering a desired final elevation of the rotational axis; and
means responsive to the entering of a desired final elevation of the rotational axis for moving said axis to said elevation, said moving means including a positioning motor which when energized changes the elevation of the rotational axis;
wherein the moving means is disabled from accepting the entering of a desired final elevation when the driving means is driving the saw blade around its rotational axis.

6. A power saw as set forth in claim 5 wherein the manually operable means includes means for entering desired final elevations above and below the reference elevation.

7. A power saw as set forth in claim 5 further including means for displaying the desired final elevation as it is entered by the manually operable means.

8. A power saw as set forth in claim 7 wherein the moving means includes logic means responsive to the elevation sensing means for controlling the displaying means to display the actual elevation of the rotational axis with respect to the reference elevation while the moving means is moving the rotational axis to the desired final position.

9. A bench power saw comprising:
a table for supporting a workpiece;
means adapted for driving a saw blade or the like around its rotational axis to cut the workpiece;
means for sensing the elevation of the rotational axis with respect to a reference elevation;
manually operable means for entering a desired final elevation of the rotational axis; and
means responsive to the entering of a desired final elevation of the rotational axis for moving said axis to said elevation, said moving means including a positioning motor which when energized changes the elevation of the rotational axis;
the final approach to the desired final elevation always occurring from the same direction.

10. A power saw as set forth in claim 9 further including means for displaying the actual elevation of the rotational axis with respect to the reference elevation.

11. A power saw as set forth in claim 9 further including means for setting the reference elevation, said moving means including means for storing the reference elevation.

12. A power saw as set forth in claim 11 further including means for displaying a warning to the saw operator when no reference elevation is stored.

13. A bench power saw comprising:
a table for supporting a workpiece; means adapted for driving a saw blade or the like around its rotational axis to cut the workpiece;
means for sening the elevation of the rotational axis with respect to a reference elevation;
manually operable means for entering a desired final elevation of the rotational axis;
means responsive to the entering of a desired final elevation of the rotational axis for moving said axis to said elevation, said moving means including a positioning motor which when energized changes the elevation of the rotational axis;
means for setting the reference elevation, said moving means including means for storing the reference elevation; and
master switch means for controlling the supplying of power to the driving means and for signalling that the manually operable entering means should be enabled, the moving means being responsive to one state of the master switch to enable the manually operable entering means, and means for supplying power to the reference elevation storing means even when the driving means is not being supplied with power and the manually operable entering means is not enabled so that the reference elevation is retained even while the manually operable means is inoperative.

14. A bench power saw comprising:
a table for supporting a workpiece;
means adapted for driving a saw blade or the like around its rotational axis to cut the workpiece;
means for sensing the elevation of the rotational axis with respect to a reference elevation;
manually operable means for entering a desired final elevation of the rotational axis;
means responsive to the entering of a desired final elevation of the rotational axis for moving said axis to said elevation, said moving means including a positioning motor which when energized changes the elevation of the rotational axis;
means responsive to the elevation sensing means for storing the actual elevation of the rotational axis; and
means for supplying power to the actual elevation storing means independently of whether the manually operable entering means is enabled.

15. A bench power saw comprising:
a table for supporting a workpiece;
means adapted for driving a saw blade or the like around its rotational axis to cut the workpiece;
means for sensing the elevation of the rotational axis with respect to a reference elevation;
manually operable means for entering a desired final elevation of the rotational axis;
means responsive to the entering of a desired final elevation of the rotational axis for moving said axis to said elevation, said moving means including a positioning motor which when energized changes the elevation of the rotational axis; and means for displaying to the saw operator the fact that a jam has occurred during the moving of the rotational axis by the moving means;

wherein the displaying means also includes means for displaying to the operator the elevation at which the jam occurred.

16. A bench power saw comprising:

a table for supporting a workpiece;

means adapted for driving a saw blade or the like around its rotational axis to cut the workpiece;

means for sensing the elevation of the rotational axis with respect to a reference elevation;

manually operable means for entering a desired final elevation of the rotational axis;

means responsive to the entering of a desired final elevation of the rotational axis for moving said axis to said elevation, said moving means including a positioning motor which when energized changes the elevation of the rotational axis; and wherein the moving means is responsive to the fact that a jam has occurred during the moving of the rotational axis downwardly to raise the rotational axis a preset amount to free any workpiece which might be jammed beneath the descending saw blade.

17. A bench power saw comprising:

a table for supporting a workpiece;

means adapted for driving a saw blade or the like around its rotational axis to cut the workpiece;

means for sensing a position of the rotational axis with respect to a reference elevation;

manually operable means for entering a desired final position of the rotational axis;

means responsive to the entering of a desired final position of the rotational axis for moving said axis to said position, said moving means including a positioning motor which when energized changes the elevation of the rotational axis; and manually operable calibration means for setting a zero position for the rotational axis;

wherein the moving means includes means for storing the zero position for the rotational axis, further including means for supplying power to the storing means indpendently of whether power is supplied to the driving means and of whether the manually operable entering means is enabled.

18. A power saw as set forth in claim 17 further including manually operable means for entering a reference elevation of the rotational axis, which reference elevation may differ from the zero position.

19. A power saw as set forth in claim 18 further including display means for displaying the actual elevation of the rotational axis with respect to the reference elevation.

20. A power saw as set forth in claim 17 further including means for displaying to the saw operator the fact that no zero position is stored in the storing means.

21. A bench power saw comprising:

a table for supporting a workpiece;

means adapted for driving a saw blade or the like around its rotational axis to cut the workpiece;

means for sensing the bevel angle of the rotational axis with respect to a reference bevel angle;

manually operable means for entering a deisred final bevel angle of the rotational axis; and means responsive to the entering of a desired final bevel angle of the rotational axis for moving sais axis to said bevel angle, said moving means including a positioning motor which when energized changes the bevel angle of the rotational axis;

wherein the manually operable means includes means for requesting a continuing change in bevel angle, the moving means being responsive to said request to continue changing the bevel angle within preset limits until the request ceases or the preset limits are reached.

22. A power saw as set forth in claim 21 wherein the requesting means includes first means for requesting a change in the bevel angle of the rotational axis in a first direction and second means for requesting a change in the bevel angle in the opposite direction.

23. A power saw as set forth in claim 21 wherein the moving means is responsive to an actuation of the requesting means lasting less than a predetermined time to change the bevel angle of the rotational axis a preset amount.

24. A power saw as set forth in claim 23 wherein the manually operable means includes means for entering a desired final bevel angle of the rotational axis, the moving means being responsive to the entering of a desired final bevel angle to move the rotational axis to said final bevel angle except when the driving means is driving the saw blade around its rotational axis, the moving means also being responsive to the actuation of the requesting means for less than the predetermined time to change the bevel angle of the rotational axis the preset amount except when the driving means is driving the saw blade.

25. A bench power saw comprising:

a table for supporting a workpiece;

means adapted for driving a saw blade or the like around its rotational axis to cut the workpiece;

means for sensing the bevel angle of the rotational axis with respect to a reference bevel angle;

manually operable means for entering a desired final bevel angle of the rotational axis; and means responsive to the entering of a desired final bevel angle of the rotational axis for moving said axis to said bevel angle, said moving means including a positioning motor which when energized changes the bevel angle of the rotational axis;

wherein the moving means is disabled from accepting the entering of a desired final bevel angle when the driving means is driving the saw blade around its rotational axis.

26. A power saw as set forth in claim 25 wherein the manually operable means includes means for entering both positive and negative desired final bevel angles.

27. A power saw as set forth in claim 25 further including means for displaying the desired final bevel angle as it is entered by the manually operable means.

28. A power saw as set forth in claim 27 wherein the moving means includes logic means responsive to the position sensing means for controlling the displaying means to display the actual bevel angle of the rotational axis with respect to the reference bevel angle while the moving means is moving the rotational axis to the desired final bevel angle.

29. A bench power saw comprising:

a table for supporting a workpiece;

means adapted for driving a saw blade or the like around its rotational axis to cut the workpiece;

means for sensing the bevel angle of the rotational axis with respect to a reference bevel angle;

manually operable means for entering a desired final bevel angle of the rotational axis; and means responsive to the entering of a desired final bevel angle of the rotational axis for moving said axis to said bevel angle, said moving means including a positioning motor which when energized changes the bevel angle of the rotational axis;

the final approach to the desired final bevel angle always occurring from the same direction.

30. A bench power saw comprising:
a table for supporting a workpiece;
means adapted for driving a saw blade or the like around its rotational axis to cut the workpiece;
means for sensing the bevel angle of the rotational axis with respect to a reference bevel angle;
manually operable means for entering a desired final bevel angle of the rotational axis;
means responsive to the entering of a desired final bevel angle of the rotational axis for moving said axis to said bevel angle, said moving means including a positioning motor which when energized changes the bevel angle of the rotational axis;
wherein the moving means includes means responsive to the position sensing means for storing the actual bevel angle of the rotational axis; and
means for supplying power to the actual bevel angle storing means independently of whether the manually operable entering means is enabled.

31. A bench radial arm power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis;
means responsive to the entering of a desired final position of the rotational axis for moving said axis to said position, said moving means including a positioning motor which when energized changes the position of the rotational axis;
means for manually changing the miter angle of the saw;
means for sensing the miter angle;
means for adjusting the zero angle with respect to which the miter angle is measured;
means for storing the zero angle independently of whether the manually operable entering means is enabled; and
display means for warning the saw operator that no zero angle is stored in the storing means.

32. A power saw as set forth in claim 31 including means for substantially continuously monitoring the miter angle sensing means.

33. A bench radial arm power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis;
means responsive to the entering of a desired final position of the rotational axis for moving sais axis to said position, said moving means including a positioning motor which when energized changes the position of the rotational axis;
means for manually changing the miter angle; and
means for sensing the miter angle;
wherein the sensing means includes means for generating at least two separate waveforms as the miter angle is changed, further including logic means for decoding the waveforms to determine the miter angle.

34. A power saw as set forth in claim 33 wherein the waveforms are square waves.

35. A power saw as set forth in claim 33 wherein the waveform generating means includes a disk and at least three contacts, which disk and contacts rotate with respect to each other as the miter angle is manually changed.

36. A power saws as set forth in claim 35 wherein the disk includes two concentric rings of spaced conductors to generate the waveforms.

37. A power saw as set forth in claim 33 wherein the waveforms are square waves, further including control logic for counting the transitions of the square waves to determine the miter angle.

38. A power saw as set forth in claim 37 wherein the square waves are substantially 90° out of phase.

39. A power saw as set forth in claim 37 wherein the control logic is responsive to the relative phase of the two waveforms to count transitions in the proper direction.

40. A bench radial arm power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis;
means responsive to the entering of a desired final position of the rotational axis for moving said axis to said position, said moving means including a positioning motor which when energized changes the position of the rotational axis;
means for manually changing the bevel angle;
means for sensing the bevel angle;
means for adjusting the zero angle with respect to which the bevel angle is measured;
means for storing the zero angle independently of whether the manually operable entering means is enabled; and
display means for warning the saw operator that no zero angle is stored in the storing means.

41. A power saw as set forth in claim 40 including means for substanitally continuously monitoring the bevel angle sensing means.

42. A bench radial arm power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis;
means responsive to the entering of a desired final position of the rotational axis for moving said axis to said position, said moving means including a positioning motor which when energized changes the position of the rotational axis;
means for manually changing the bevel angle; and
means for sensing the bevel angle;
wherein the sensing means includes means for generating at least two separate waveforms as the bevel angle is changed, further including logic means for decoding the waveforms to determine the bevel angle.

43. A power saw as set forth in claim 42 wherein the waveforms are square waves.

44. A power saw as set forth in claim 42 wherein the waveform generating means includes a disk and at least three contacts, which disk and contacts rotate with respect to each other as the bevel angle is manually changed.

45. A power saw as set forth in claim 44 wherein the disk includes two concentric rings of spaced conductors to generate the waveforms.

46. A power saw as set forth in claim 42 wherein the waveforms are square waves, further including control logic for counting the transitions of the square waves to determine the bevel angle.

47. A power saw as set forth in claim 46 wherein the square waves are substantially 90° out of phase.

48. A power saw as set forth in claim 46 wherein the control logic is responsive to the relative phase of the two waveforms to count transitions in the proper direction.

49. A bench power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis;
means responsive to the entering of a desired final position of the rotational axis for moving said axis to said position, said moving means including a positioning motor which when energized changes the position of the rotational axis; and
means for setting the reference position, means for storing that reference position, and means for rendering the manually operable entering means inoperative without affecting the reference position.

50. A bench power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis; and
means responsive to the entering of a desired final position of the rotational axis for moving said axis to said position, said moving means including a positioning motor which when energized changes the position of the rotational axis;
wherein the moving means includes means for substantially containuously monitoring the sensing means and further including means for rendering the manually operable entering means inoperative without affecting the monitoring of the sensing means.

51. A power saw as set forth in claim 50 wherein the manually operable entering means includes means for entering a plurality of different desired changes in position, such as changes in elevation and bevel, and further including means for indicating the particular type of desired change being entered.

52. A power saw as set forth in claim 51 wherein the manually operable entering means including means for entering desired changes in elevation and bevel and means for initiating both desired changes, the moving means being responsive to the entering of both a desired elevation change and a desired bevel change followed by actuation of the initiating means to change the elevation and bevel to the desired values.

53. A bench power saw comprising:
a table for supporting a workpiece;
means adapted for driving a saw blade or the like around its rotational axis to cut the workpiece;
means for sensing a position of the rotational axis with respect to a reference position;
manually operable means for entering a desired final position of the rotational axis; and
means responsive to the entering of a desired final position of the rotational axis for moving said axis to said position, said moving means including a positioning motor which when energized changes the position of the rotational axis;
wherein the sensing means senses rotations of the positioning motor and the moving means includes means for compensating for the nonlinearity in movement of the axis with respect to rotations of the positioning motor.

54. A power saw as set forth in claim 53 wherein the compensating means includes a table reflecting expected nonlinearity as a function of position.

* * * * *

UNITED STATES PATENT AND TRADEMARK OFFICE
CERTIFICATE OF CORRECTION

PATENT NO. : 4,641,557

DATED : Feb. 10, 1987

INVENTOR(S) : Robert E. Steiner et al

It is certified that error appears in the above—identified patent and that said Letters Patent is hereby corrected as shown below:

Column 2, line 4, after "illustrating" insert --- the bevel ---
    Column 2, line 9, after "radial" insert --- arm saw ---
    Column 2, line 11, after "connection" insert --- circuitry ---
    Column 2, line 14, after "position-sensing" insert --- circuitry ---

Column 6, line 53 delete "high" and insert --- high) ---
    Column 14, line 12 delete "sening" and insert --- sensing ---
    Column 15, line 44 delete "indpendently" and insert --- independently ---
    Column 15, line 64 delete "deisred" and insert --- desired ---
    Column 15, line 67 delete "sais" and insert --- said ---
    Column 17, line 63 delete "sais" and insert --- said ---
    Column 18, line 49 delete "substanitally" and insert --- substantially ---

UNITED STATES PATENT AND TRADEMARK OFFICE
CERTIFICATE OF CORRECTION

PATENT NO. : 4,641,557

DATED : Feb. 10, 1987

INVENTOR(S) : Robert E. Steiner et al

It is certified that error appears in the above-identified patent and that said Letters Patent is hereby corrected as shown below:

Column 20, line 7 delete "containuously" and insert
--- continuously ---.

Signed and Sealed this

Twenty-second Day of September, 1987

Attest:

DONALD J. QUIGG

Attesting Officer     Commissioner of Patents and Trademarks